United States Patent [19]
Lu et al.

[11] Patent Number: 6,162,859
[45] Date of Patent: Dec. 19, 2000

[54] HOT MELT PRESSURE SENSITIVE ADHESIVES BASED ON COMPATIBILIZED BLENDS OF ELASTOMERS

[75] Inventors: Xinya Lu, Towaco; Ingrid Cole, Somerville, both of N.J.

[73] Assignee: National Starch and Chemical Investment Holding Corporation, Wilmington, Del.

[21] Appl. No.: 09/326,856

[22] Filed: Jun. 7, 1999

[51] Int. Cl.[7] ............................. C08L 53/02; C08L 91/08; C08L 93/04; C08K 5/01
[52] U.S. Cl. ........................ 524/505; 524/271; 524/474; 524/478; 524/481; 524/484; 524/485; 524/486; 524/487; 524/488; 524/489; 524/499
[58] Field of Search ..................... 524/271, 474, 524/478, 481, 484, 485, 486, 487, 488, 505, 489, 499

[56] References Cited

U.S. PATENT DOCUMENTS

| | | | |
|---|---|---|---|
| 4,080,348 | 3/1978 | Korpmann | 524/271 |
| 4,125,665 | 11/1978 | Bemmels et al. | 428/352 |
| 4,699,938 | 10/1987 | Minamizaki et al. | 524/271 |
| 5,290,842 | 3/1994 | Sasaki et al. | 524/271 |
| 5,663,228 | 9/1997 | Sasaki et al. | 524/271 |

*Primary Examiner*—Peter A. Szekely
*Attorney, Agent, or Firm*—Thomas F. Roland, Esq.

[57] ABSTRACT

The present invention is directed to hot melt pressure sensitive adhesive compositions, that exhibit excellent adhesion properties and improved thermal stability, said compositions comprising:

a) 1 to 30 parts of styrene-butadiene-styrene triblock copolymer;

b) 1 to 30 parts of styrene-isoprene-styrene triblock copolymer;

c) 5 to 50 parts of a tackifier compatible with the butadiene and isoprene midblocks, but not compatible with the styrene end blocks;

d) 5 to 70 parts of a tackifier compatible with the butadiene and isoprene midblocks, and the styrene end blocks;

e) 5 to 30 parts of a tackifier compatible with the styrene end blocks, but not compatible with the butadiene and isoprene midblocks;

f) 5 to 30 parts oil; and g) 0 to 5 parts wax.

12 Claims, No Drawings

HOT MELT PRESSURE SENSITIVE ADHESIVES BASED ON COMPATIBILIZED BLENDS OF ELASTOMERS

FIELD OF THE INVENTION

The present invention is directed to hot melt pressure sensitive adhesive compositions that exhibit excellent adhesion properties and improved thermal stability.

BACKGROUND OF THE INVENTION

Hot melt adhesives, 100% solids materials, which are applied to a substrate when molten and cooled to harden the adhesive layer, are widely used for industrial applications.

Current hot melt pressure sensitive adhesive technology utilizes either styrene-butadiene-styrene, "SBS" or styrene-isoprene-styrene, "SIS" elastomers in the adhesive composition. SBS and SIS are not compatible with each other and therefore are not usually used in the same adhesive composition.

U.S. Pat. No. 5,290,842 discloses pressure sensitive adhesives comprising both SIS and SBS, however this composition is not compatible and has inferior performance properties.

Both SIS and SBS have been used separately to formulate hot melt pressure sensitive adhesives. Unfortunately, SIS and SBS are naturally incompatible, and thus a SIS/SBS blended pressure sensitive adhesive usually does not have good adhesion properties.

It has been found, in accordance with the present invention, that blends of SIS and SBS can be made compatible by utilizing their common styrene end-blocks to enhance the compatibility of their dissimilar mid-blocks. Two types of resins can be utilized to enhance the compatibility of SIS and SBS. One is end-block compatible resin and the other is both mid- and end-block compatible resin. The end-block compatible resin can enlarge and reinforce the end-block domains to force the mixing of the two mid-block, while the mid/end-block compatible resin can function as a good solvent for both the polymers to solubilize the two mid-blocks together. As used herein, the "mid-block" of the polymer refers to polymeric blocks which are substantially aliphatic. "Endblock" of the polymer refers to polymeric blocks which are substantially aromatic.

The present invention provides a hot melt pressure sensitive adhesive based on a compatibilized blend of SIS and SBS elastomers which displays excellent adhesion properties compared to SIS, SBS or incompatible blends. These adhesives will also have improved thermal stability and aging properties compared to SIS based or SBS based formulations. SIS undergoes thermal degradation and its melt viscosity decreases very rapidly during hot melt processing, while SBS experiences thermal crosslinking and its melt viscosity increases quickly. As a result, blends of SIS and SBS, if compatibilized, will show less change in the melt viscosity and the adhesion properties after aging.

SUMMARY OF THE INVENTION

The present invention is directed to hot melt pressure sensitive adhesive compositions, that exhibit excellent adhesion properties and improved thermal stability, said compositions comprising:

a) 1 to 30 parts of styrene-butadiene-styrene triblock copolymer;
b) 1 to 30 parts of styrene-isoprene-styrene triblock copolymer;
c) 5 to 50 parts of a tackifier compatible with the butadiene and isoprene midblocks, but not compatible with the styrene end blocks;
d) 5 to 70 parts of a tackifier compatible with the butadiene and isoprene midblocks, and the styrene end blocks;
e) 5 to 30 parts of a tackifier compatible with the styrene end blocks, but not compatible with the butadiene and isoprene midblocks;
f) 5 to 30 parts oil; and
g) 0 to 5 parts wax.

DESCRIPTION OF THE INVENTION

The polymers used in formulating the pressure-sensitive adhesives of this invention are based on natural and/or synthetic elastomeric polymers. Useful are AB, ABA and $(AB)_x$ block copolymers wherein x has a value of 3 or more and wherein A is a block comprising at least one monoalkenyl arene, preferably styrene, alpha methyl styrene, vinyl toluene and the like, and B is an elastomeric conjugated diene block, preferably a polybutadiene or a polyisoprene block. Preferably at least one is based on polybutadiene blocks and one other is based on polyisoprene blocks. These include, but are not limited to, homopolymers, block, random or multiarmed copolymers, and mixtures thereof. Among the useful elastomeric polymers there may be mentioned natural rubber (polyisoprene), polybutadiene, synthetic polyisoprene, random styrene-butadiene polymers, styrene-butadiene (SB) block copolymers, multiarmed and repeating (SB) copolymers, styrene-butadiene-styrene (SBS) block copolymers, styrene-isoprene (SI) block copolymers, styrene-isoprene-styrene (SIS) block copolymers, multiarmed styrene-isoprene $(SI)_x$ block copolymers, and the like. It will be understood that random copolymers may also be used and can reverse the diene preferentially tackified so long as the glass transition temperature of the polymer exhibiting the highest glass transition temperature is increased relative to the polymer of lower glass transition temperature.

Most preferred block copolymers are blends of polystyrene-polybutadiene-polystyrene and polystyrene-polyisoprene-polystyrene copolymers.

Preferably the hot melt pressure sensitive adhesive of the present invention comprises: (a) 1 to 30 parts of styrene-butadiene-styrene triblock copolymer, most preferably; and (b) 1 to 30 parts of styrene-isoprene-styrene triblock copolymer. In a preferred embodiment, the SBS triblock copolymer will have 25 to 35% styrene, and a melt index of less than 1; and the SIS triblock copolymer will have 14 to 30% styrene and a melt index of less than 10.

In a preferred embodiment, the hot melt pressure sensitive adhesive will have 15 parts SBS and 5 parts SIS.

These triblock copolymers may be prepared using methods familiar to one of ordinary skill in the art. Alternatively, these polymers may be obtained commercially. For example, SBS triblock copolymers are available from Shell Chemical Co. under the tradenames KRATON D1101, with a styrene content of 31% and viscosity at 25% in toluene of 4000 cPs and KRATON D1184 with a styrene content of 30% and a viscosity at 25% in toluene of 20,000 cPs. Examples of other commercially available SBS copolymers include SOLT 6302, 30% styrene, viscosity at 25% in toluene of 4000 cPs available from EniChem Americas (Agip U.S.A. Inc.); and DPX 563 with styrene content of 31% and viscosity in toluene at 25% of 7970 cPs available from Dexco.

Examples of commercially available SIS triblock copolymers are KRATON D1111, from Shell Chemical Company with 22% styrene and a melt index of 3.0 and KRATON D1107 with 14% styrene and melt index of 11. Other commercially available SIS triblock copolymers include QUNITAC 3530 from Nippon ZEON with 16% styrene and a melt index of 1.0, and SOLT 193A from Enichem with 25% styrene and a melt index of 3.0.

Blends of these styrene containing copolymers with other compatible block copolymers may also be employed.

Commercially available SIS and SBS triblocks are not typically pure triblock, but comprise some diblock polymers.

Blends of SIS and SBS are prepared by hot melt mixing using high shear, as will be familiar to one of ordinary skill in the art.

The hot melt pressure sensitive adhesive of the present invention also comprises three tackifying resins. The first, a tackifier compatible with the butadiene and isoprene midblocks, but not compatible with the styrene end blocks, herein after designated tackifier A, is present in an amount of 5 to 50 parts, preferably 20 to 30 parts, of the compositions. Tackifier A is an aliphatic hydrocarbon resin, a hydrogenated aliphatic hydrocarbon resin or a hydrogenated aromatic resin. Examples of tackifier A include WINGTAC 95, an aliphatic resin with a Ring and Ball softening point of 98° C.; ESCOREZ 1310LC, an aliphatic resin with softening point of 93° C.; ESCOREZ 1304, an aliphatic resin with softening point of 100° C. An example of a hydrogenated hydrocarbon is ESCOREZ ECR-149 with softening point of 95° C.

The second tackifier, hereinafter tackifier B, is a tackifier compatible with the butadiene and isoprene midblocks, and the styrene end blocks. Tackifier B is present in an amount of 5 to 70 parts, preferably 20 to 30 parts, of the adhesive composition. Tackifier B is a rosin ester tackifier selected from the group consisting of natural and modified rosins such as gum rosin, wood rosin, tall-oil rosin, distilled rosin, hydrogenated rosin, dimerized rosin, polymerized rosin, as well as the glycerol and pentaerythritol esters of natural and modified rosins, such as, for example, the glycerol ester of pale wood rosin, the glycerol ester of hydrogenated rosin, the glycerol ester of polymerized rosin, the pentaerythritol ester of hydrogenated rosin, the phenolic-modified pentaerythritol ester of rosin, and combinations thereof. An example of tackifier B is UNI-TAC R100L, a polyethylene ester of tall oil rosin with a Ring and Ball softening point of 99° C.

The third tackifier, hereinafter tackifier C, is a tackifier compatible with the styrene end blocks, but not compatible with the butadiene and isoprene midblocks. Tackifier C, which is present in an amount of 5 to 30 parts, preferably 11 parts, of the composition, is an aromatic resin polymerized from monomers such as styrene, alpha methyl styrene, vinyl toluene polyphenylene oxide and the like. An example of tackifier C is NORSOLENE S115, an aromatic resin with a Ring and Ball softening point of 115° C. Other examples of tackifier C include KRISTALEX 3100 a pure alpha methyl styrene resin with softening point of 100° C. or HERCULITE 240 with softening point of 120° C.

The adhesive of the present invention also comprises 5 to 30 parts, preferably 15 to 25% of an oil diluent. Suitable plasticizing or extending oils include olefin oligomers and low molecular weight polymers as well as vegetable and animal oil and their derivatives. The petroleum derived oils which may be employed are relatively high boiling materials containing only a minor proportion of aromatic hydrocarbons (preferably less than 30% and, more particularly, less than 15% by weight of the oil). Alternatively, the oil may be totally non-aromatic. Suitable oligomers include polypropylenes, polybutenes, hydrogenated polyisoprene, hydrogenated polybutadiene, or the like having average molecular weights between about 350 and about 10,000. Examples of oils suitable for use herein include LUMINOL T350, a mineral oil available from Petrocanada and KAYDOL OIL available from Witco Corporation. Preferred is PENNZNAP and PENNZOIL N 500HT a naphthenic oil from Penzoil.

The hot melt pressure sensitive adhesive of the present invention may also optionally comprise up to 5 parts, preferably 1%, of a compatible wax. Examples of suitable waxes include microcrystalline waxes with a melting point of 155° F. to 265° F. such as MICROSERE 5999 with melting point of 195° F. and MICROSERE 5812 with melting point of 185° F., both available from IGI.

The hot melt adhesive of the present invention may also comprise up to 3 parts, preferably 0.25 parts, of an optional antioxidant. Among the applicable stabilizers or antioxidants included herein are the hindered phenols or hindered phenols in combination with a secondary antioxidant such as distearyl thiodipropionate ("DSTDP") or dilauryl thiodipropionate ("DLTDP"). Hindered phenols as used herein are as phenolic compounds containing sterically bulky radicals in close proximity to the phenolic hydroxyl group thereof. The presence of these sterically bulky substituted radicals in the vicinity of the hydroxyl group serves to retard its stretching frequency and, correspondingly, the reactivity; this steric hindrance provides the phenolic compound with its stabilizing properties. Representative hindered phenols include: 1,3,5-trimethyl 2,4,6-tris (3,5-di-tert-butyl-4-hydroxybenzyl)benzene; pentaerythrityl tetrakis-3(3,5-di-tert-butyl-4-hydroxyphenyl)propionate; pentaerythritol tetrakis (3-lauryl thiodipropionate); n-octadecyl-3,5-di-tert-butyl-4-hydroxyphenol)-propionate; 4,4'-methylenebis (2,6-tert-butylphenol); 4,4'-thiobis(6-tert-butyl-o-cresol); 2,6-di-tertbutylphenol; 6-(4-hydroxyphenoxy)-2,4-bis(n-octyl-thio)-1,3,5-triazine; di-n-octadecyl 3,5-di-tert-butyl-4-hydroxy-benzyl-phosphonate; 2-(n-octylthio)ethyl 3,5-di-tert-butyl-4-hydroxy-benzoate; and sorbitol hexa[3-(3,5-di-tert-butyl-4-hydroxyphenyl)-propionate]. Preferred antioxidants are SUMILIZER TDP, which is pentaerythritol-tetrakis(beta-lauryl-thio-propionate), a secondary antioxidant available from Sumitomo Chemical Company and IRGANOX 1010 a hindered phenol primary antioxidant available from Ciba-Geigy. Other antioxidants include ETHANOX 330, a hindered phenol from Albermarle; SANTOVAR A, a 2,5 ditert-amyl hydroquinone from Monsanto; and NAVAGARD P a tris(p-nonylphenyl)phosphite from Uniroyal.

Optional additives may be incorporated into the hot melt compositions depending on the end use of the composition. Among these additives may be included colorants such as titanium dioxide; and fillers such as talc and clay, etc., as well as minor amounts (e.g., less than about 5%) of a petroleum derived wax.

The hot melt adhesives of the present invention find particularly use with tapes and labels; embodiments of the present invention include tapes and labels comprising the hot melt adhesives of the present invention.

The following examples are merely illustrative and not meant to limit the scope of the present invention in any manner.

EXAMPLES

Viscosity

Viscosity measurements were made in a Brookfield viscometer at 325° F. and are shown in cPs units.

Peel Strength Measurements

Peel strength was measured by performing a 180° peel test on stainless steel panels using an Instron. About 1.0 mil thick coating of the adhesive was applied on to silicone release paper using heated rollers and bonded to Mylar film. Three specimens each 3"×1" in dimensions were cut perpendicular to the machine direction from the coated Mylar. After conditioning overnight at 72° F. and 50% relative humidity, the release paper was removed and the specimens are bonded to stainless steel panels. The bonds are then rolled using a 4.5 lb. roller. After conditioning the bonds for about 20 minutes, the bonds were peeled in the Instron at 2"/minute. The stainless steel panel was in the stationary jaw, and the Mylar was in the movable jaw. The results are reported as an average load in oz/in.

Thermal Stability

Thermal stability was measured by the melt viscosity change of the adhesive at 350° F. The adhesive was aged at 350° F. in a glass jar covered with aluminum foil. The melt viscosity was measured after the adhesive was aged for 24 hours.

Loop Tack Measurements

Loop tack was measured using the TMI Loop Tack tester made by cutting 5"×1" dimensions specimens of the Mylar coated laminates along the machine direction. After conditioning overnight at 72° F. and 50% relative humidity, the laminate was folded into a loop by taping the ends together. The loop was then mounted on the Loop tack tester and a stainless steel plate clamped to the base of the tester. When the test was started, the loop was brought in contact with the Stainless Steel plate and then withdrawn. The load it takes to withdraw from the plate was recorded as the loop tack in $oz/in^2$.

Shear

About 1.0 mil thick coating of the adhesive was applied on to silicone release paper using heated rollers and bonded to Mylar film. The lamination was cut to 1 by ½ inch strips. The release paper is removed and the Mylar bonded to stainless steel. A one mil transfer coating of the adhesive was made using heated rollers and a 1.0 by 0.5 inch strip of the specimen was bonded to a stainless steel plate. The bonds were then rolled using a 4.5 lb roller. After conditioning the bonds for about 20 minutes, the plates are secured onto the shear test stand a 1000 gram weight is applied to each plate. The time that the specimen takes to slip from the plate was recorded as shear strength.

Rheology Study

A Rheometrics Dynamic Mechanical Analyzer (model RDA 700) was used to obtain the elastic (G') and loss (G") moduli versus temperature. The instrument was controlled by Rhios software version 4.3.2. Parallel plates 8 mm in diameter and separated by a gap of about 2 mm were used. The sample was loaded and then cooled to about −100° C. and the time program started. The program test increased the temperature at 5° C. intervals followed by a soak time at each temperature of 10 seconds. The convection oven containing the sample was flushed continuously with nitrogen. The frequency was maintained at 10 rad/s. The initial strain at the start of the test was 0.05% (at the outer edge of the plates.) An autostrain option in the software was used to maintain an accurately measurable torque throughout the test. The option was configured such that the maximum applied strain allowed by the software was 80%. The autostrain program adjusted the strain at each temperature increment if warranted using the following procedure. If the torque was below 200 g-cm, the strain was increased by 25% of the current value. If the torque was above 1200, it was decreased by 25% of the current value. At torques between 200 and 1200 g-cm, no change in strain was made at that temperature increment. The shear storage or elastic modulus (G') and the shear loss modulus (G") are calculated by the software from the torque and strain data. Their ratio, G"/G', also known as the tan delta, was also calculated. The temperature corresponding to the tan δ peak associated with the midblock is reported as the midblock Tg.

In the following tables, stiffness values, G', are reported in units of $10^5$ $dyne/cm^2$ at 40° C.

Example 1

A hot melt pressure sensitive adhesive, in accordance with the present invention, Sample 1-A, was prepared and compared to a conventional SIS based hot melt adhesive formulation commercially available from National Starch and Chemical Company as 34-4134, Comparative A.

| Sample 1-A | |
|---|---|
| QUINTAC 3530 | 5 |
| SOL T 6302 | 15 |
| UNI-TAC R1001 | 25 |
| WINGTAC 95 | 25 |
| PENNZOIL N500 HT | 25.5 |
| IRGANOX 1010 | 0.5 |
| NORSOLENE S115 | 25 |

The following results were obtained:

| | 180° Peel | Loop Tack | Shear 4 psi @ 72° F. |
|---|---|---|---|
| Sample 1-A | 7.45 ± 0.05 lb/in | 236 $oz/in^2$ | 50 hrs. |
| Comparative A | 6.74 ± 0.11 lb/in | 112 $oz/in^2$ | 90 hrs. |

Sample 1-A performed better than the conventional adhesive sample, Comparative A.

Example 2

A hot melt pressure sensitive adhesive was developed by blending SIS and SBS block copolymers, Sample 2-A. The composition offers the same or better adhesion properties as a conventional adhesive product, Comparative A, as described in Example 1.

A formulation in accordance with present invention was prepared:

| Sample 2-A | |
|---|---|
| KRATON 1111 | 5 |
| SOL T 6302 | 15 |
| UNITAC R100 L | 23.4 |
| WINGTAC 95 | 23.4 |
| NORSOLENE S115 | 11 |
| PENZNAP | 21.5 |
| ETHANOX 330 | 0.25 |
| SANTOVAR A | 0.25 |
| NAUGARD P | 0.2 |

The thermal stability as well as aging tests were completed. Sample 2-A and Comparative A, were separately coated at 1 mil to release and transferred to 2 mil polyethylene terephthalate. The coatings were placed in the oven at 150° F. and allowed to cool 24 hours before testing. The test results are shown in Table 1. As indicated by the test data, Sample 2-A is as effective as Comparative A in terms of stability and adhesion properties. Specifically, Sample 2-A has better peel and loop tack results.

TABLE 1

Performance Property Comparison

|  | Comparative A | Sample 2-A |
|---|---|---|
| Thermal Stability (350° F./24 hrs.) | | |
| Initial Viscosity @ 325° F. | 8650 | 5375 |
| Viscosity after 24 hrs. | 4375 | 4200 |
| % Viscosity change | −50% | −22% |
| Aging Study @ 150° F. | | |
| Loop Tack | | |
| Initial | 145 | 167 |
| One Week | 135 | 163 |
| Two Weeks | 140 | 168 |
| 180° Peel | | |
| Initial | 5.6 | 7.4 |
| One Week | 7.3 | 7.7 |
| Two Weeks | 7.5 | 7.7 |
| Shear @ 4 PSI | | |
| Initial | 108 | 23 |
| One Week | 83 | 71 |
| Two Weeks | 78 | 59 |

Example 3

Three different formulations, as shown below in Table 2, were prepared in order to demonstrate the compatibilizing capability for each type of Tackifier. Sample 3-A, which comprises all three types of tackifiers, exhibits excellent compatibility and very high performance because both end-block resin (NORSONLENE S115) and mid/end-block resin (UNITAC R100L) are used to improve the compatibility of SBS and SIS. Sample 3-B, without the mid/end-block, Tackifier B, is not compatible and shows very poor adhesive performance, while Sample 3-C, without the end-block resin, Tackifier C, is only partial compatible and displays the inferior performance.

TABLE 2

Composition, Compatibility and Performance

| Composition | Sample 3-A | Sample 3-B | Sample 3-C |
|---|---|---|---|
| KRATON D111 | 5 | 5 | 5 |
| SOL T 6302 | 15 | 15 | 15 |
| WINGTAC 95 | 23.5 | 47 | 29 |
| UNITAC R100L | 23.5 | — | 29 |
| NORSOLENE S115 | 11 | 11 | — |
| PENNZOIL | 21.5 | 21.5 | 21.5 |
| IRGANOX 1010 | 0.5 | 0.5 | 0.5 |
| Clarity and Compatibility | clear yes | opaque no | slightly opaque partial |
| 180 peel (lb/in) | 7.50 | 5.10 | 5.70 |
| Loop tack (oz/in$^2$) | 167 | 23 | 93 |
| Shear (4 psi) | 22 hrs | 14 hrs | 14 hrs |

Example 4

This example illustrates that addition of a small amount of wax into the adhesive will increase the stiffness (bulky properties) but not impact the tack (surface properties). Sample 4-A is the same as 2-A above. Wax A is MICROSERE 599 with melting point of 195° F.; and wax B is MICROSERE 5812 with melting point of 185° F.

|  | 34-4134 | Sample 4-A | Sample 4-A with 1% wax A | Sample 4-A with 1% wax B |
|---|---|---|---|---|
| Peel | 4.8 lb/in | 6.2 lb/in | 6.2 lb/in | 5.7 lb/in |
| Loop tack | 86 oz/in$^2$ | 99 | 95 | 98 |
| Shear @ 4 psi | 59 hrs | 12 | 36 | 34 |

In addition to the above tests, each of the above samples was coated on a release liner and covered with 60 lb. paper. No bleed through was observed for any of the formulas after one week at 120° F. Although it is expected that the addition of wax should cause the adhesive sample to loose tack, here the samples showed no loss of tack, and improved shear.

Example 5

Rheology studies of an adhesive in accordance with the present invention, Sample 2-A above, showed only one Tg value, a tan δ peak at 12° C.

We claim:

1. A hot melt pressure sensitive adhesive composition comprising:
   a) 1 to 30 parts of styrene-butadiene-styrene triblock copolymer;
   b) 1 to 30 parts of styrene-isoprene-styrene triblock copolymer;
   c) 5 to 50 parts of a tackifier compatible with the butadiene and isoprene midblocks, but not compatible with the styrene end blocks;
   d) 5 to 70 parts of a tackifier compatible with the butadiene and isoprene midblocks, and the styrene end blocks;
   e) 5 to 30 parts of a tackifier compatible with the styrene end blocks, but not compatible with the butadiene and isoprene midblocks;
   f) 5 to 30 parts oil; and
   g) 0 to 5 parts wax.

2. A hot melt pressure sensitive adhesive according to claim 1 wherein the styrene-butadiene-styrene triblock copolymer comprises 25 to 35% styrene, and has a melt index less than 1; and the styrene-isoprene-styrene triblock copolymer comprises 14 to 30% styrene and a melt index less than 10.

3. A hot melt pressure sensitive adhesive according to claim 1 wherein the styrene-butadiene-styrene triblock copolymer comprises 30% styrene, and has a melt index less than 1; and the styrene-isoprene-styrene triblock copolymer comprises 22% styrene and a melt index of 3.

4. A hot melt pressure sensitive adhesive according to claim 1 comprising 15 parts styrene-butadiene-styrene and 5 parts styrene-isoprene-styrene.

5. A hot melt pressure sensitive adhesive according to claim 1 wherein the tackifier compatible with the butadiene and isoprene midblocks, but not compatible with the styrene end blocks is selected from the group consisting of an aliphatic hydrocarbon resin, a hydrogenated aliphatic hydrocarbon resin; a hydrogenated aromatic resin, and combinations thereof.

6. A hot melt pressure sensitive adhesive according to claim 5 wherein the tackifier compatible with the butadiene and isoprene midblocks, but not compatible with the styrene end blocks is an aliphatic hydrocarbon resin with a Ring and Ball softening point of 90–100° C.

7. A hot melt pressure sensitive adhesive according to claim 1 wherein the tackifier compatible with the butadiene and isoprene midblocks, and the styrene end blocks is a rosin ester tackifier selected from the group consisting of natural and modified rosins, gum rosin, wood rosin, tall-oil rosin, distilled rosin, hydrogenated rosin, dimerized rosin, polymerized rosin, the glycerol and pentaerythritol esters of natural and modified rosins, the glycerol ester of pale wood rosin, the glycerol ester of hydrogenated rosin, the glycerol ester of polymerized rosin, the pentaerythritol ester of hydrogenated rosin, the phenolic-modified pentaerythritol ester of rosin, and combinations thereof.

8. A hot melt pressure sensitive adhesive according to claim 7 wherein the tackifier compatible with the butadiene and isoprene midblocks, and the styrene end blocks is a polyethylene ester of tall oil rosin with a Ring and Ball softening point of 99° C.

9. A hot melt pressure sensitive adhesive according to claim 1 wherein the tackifier compatible with the styrene end blocks, but not compatible with the butadiene and isoprene midblocks is an aromatic resin polymerized from monomers selected from the group consisting of styrene, alpha methyl styrene, vinyl toluene, polyphenylene oxide and combinations thereof.

10. A hot melt pressure sensitive adhesive according to claim 9 wherein the tackifier compatible with the styrene end blocks, but not compatible with the butadiene and isoprene midblocks is an aromatic resin with a Ring and Ball softening point of 100° C. to 120° C.

11. A hot melt pressure sensitive adhesive according to claim 1 wherein the oil diluent is naphthenic oil.

12. A hot melt pressure sensitive adhesive according to claim 1 wherein the wax is a microcrystalline wax with melting point of 155° C. to 265° C.

* * * * *